F. Haeck.
Alcohol Still.
N° 45,001. Patented Nov. 8, 1864.

Witnesses;
Melville Biggs
Jas. S. Ferguson

Inventor,
Francois Haeck
by his attorney
C. S. Kenrick

F. Haeck.
Alcohol Still.
N° 45,001. Patented Nov. 8, 1864.

Witnesses:
Melville Biggs
Jas. S. Ferguson.

Inventor:
François Haeck
by his attorney
C. S. Kenwick

UNITED STATES PATENT OFFICE.

FRANCOIS HAECK, OF BRUSSELS, BELGIUM.

IMPROVED PROCESS FOR THE MANUFACTURE OF GOOD-FLAVORED SPIRITS AND NEUTRAL ALCOHOL.

Specification forming part of Letters Patent No. 45,001, dated November 8, 1864.

*To all whom it may concern:*

Be it known that I, FRANCOIS HAECK, a subject of the King of Belgium, residing at Brussels, Belgium, have invented a new and useful process for the manufacture of good-flavored spirits and neutral alcohols by the previous removal of the injurious properties from bad-flavored phlegms or products of primary distillations and other alcoholic liquids; and I do hereby declare that the following is a full, clear, and exact description of the same.

The fundamental feature of the present invention is, first, to deprive the phlegms, (or crude spirits obtained by distillation from grain, maize, beets, rice, molasses, wines,) and, in fact, all bad-flavored alcoholic liquids, of their injurious constituents by a series of successive and independent operations; and, secondly, to raise the alcoholic strength of these liquids to the desired degree of proof. By injurious constituents I mean ethers, oils, and acids which are found in phlegms or bad-flavored alcoholic liquids, and which it is undesirable to retain either in brandy, rum, gin, whisky, or other portable spirits, or in concentrated spirit or alcohol produced from the phlegm or liquid.

The complete process which constitutes the invention is therefore composed of two sub-processes, and I therefore divide the description of this invention into two parts—that is to say, the description of the sub-process for removing injurious constituents from phlegm or bad-flavored alcoholic liquids, and the description of the sub-process for the evaporation, concentration, condensation, and refrigeration of the resulting liquid to the required degree of alcoholic strength or concentration.

*First part*—Description of the sub-process for depriving phlegms or badly-flavored alcoholic liquids of their injurious constituents: This process is composed of three successive operations or secondary sub-processes, consisting, the first, in separating a part of the essential oils by lowering the alcoholic degree of the phlegm sufficiently to cause the essential oils to separate in part and then decanting them; the second, in the removal of acids and another part of the essential oils by heating the liquid after decantation with powdered gypsum, or "plaster," as it is commonly called, or other material which will absorb the acids and some of the oils; the third, in heating the liquid mass slowly but continuously to a temperature lower than is required for the distillation of alcohol, in order to disengage in drops or in an exceedingly thin stream the ethers and other elements more volatile than alcohol which have not been removed by the two preceding operations.

Description of the first operation, which consists in separating a part of the essential oils freed by lowering the alcoholic degree of the liquid and then decanting the oil: This operation is performed in a cylindrical receiver or vat, Figure 4, Sheet 1. This vat is constructed by preference of wood lined with thin tinned sheet-copper. *a* is the body of the vat. *b* is the cover thereof. *c* is a conical head placed on the top of the cover. *d* is a pipe with cock *r* attached to the head *c*. *e* is an agitator with vanes *f* for agitating the liquid in the vat. *g* is a pipe for introducing liquid into the vat. *h* is the outlet-cock for the liquid, and *i* a cock by which liquid used for cleansing the vat may be drawn off. The cover *b* is fitted to the vat *a* in such manner as to prevent alcoholic evaporation and the escape of liquid. After having introduced the bad-flavored alcoholic liquid or phlegms to be treated into the vat *a*, I add sufficient water to effect the separation or liberation of the various injurious constituents—oils, ethers, and acids—from the alcohol. The mixing of the water with the mass is effected by the motion of the agitator. As a general rule I find it expedient to add sufficient water to reduce the alcoholic strength of the mixture to 14° of Baumé's hydrometer; but the quantity of water to be added bears some proportion to the quantity of injurious constituents that the phlegm contains, and the more it contains the more water is it necessary to add to liberate these constituents from the alcohol. When the mixture has been effected by the agitator, the mass is left at perfect rest, in order that the liberated oils, which are less dense than the liquid mass, may rise to the surface. When the rising of the oil is terminated, which requires a certain number of hours, water is introduced into the vat by the pipe *g*. As this introduction of water raises the level of the liquid, the oils, which are on the surface, pass into the conical head *c*, from which they flow by the pipe *d*. The separation of the oils which rise to the surface from the liquid mass is thus performed in the most simple manner by what I call "decantation," and this mixing with water, liberation, and flotation of oils and decantation constitute the first operation.

Description of the second operation, consisting in removing the remaining oils and acids held in suspension in the liquid mass by means of gypsum or other absorbent materials, such as vegetable or animal charcoal, lime, and magnesia, or mixtures of such materials: When the oils which float on the surface of the phlegm or bad-flavored liquid of low alcoholic degree have been decanted, I mix with the liquid mass powdered gypsum or other material capable of absorbing the oils and acids which remain therein. The mixture of the gypsum may be performed by introducing small quantities at a time through the head $c$, and by working the agitator. The advantage gypsum possesses over the other materials is that it deprives the liquid mass of oils and acids without introducing therein any other cause of bad flavor. Instead of mixing the gypsum in the vat shown in Fig. 4, the liquid may run into a small vat, which it need only pass through in order to become charged with as much gypsum as it is capable of carrying with it. This small vat is fitted with an agitator. The liquid flowing from the vat $a$, Fig. 4, enters continuously at the bottom and passes out continuously at the top of the second vat. After having been reagitated a certain number of times, the liquid mass containing the gypsum is left at perfect rest, either in the vessel where the agitation has been effected or in another vessel into which it is drawn off, and the solid matter mixed with the phlegms precipitates by degrees to the bottom, carrying with it oils, ethers, acids, and vegetable and other matters. This mixture with powdered gypsum or its equivalent, agitation, and subsequent precipitation constitutes the second operation.

Description of the third operation, consisting in the evaporation of ethers and essential oils more volatile than alcohol by slowly but continuously heating the liquid mass: When the deposition of the gypsum has taken place in the vat $a$, Fig. 4, or in a separate vat, as before explained, the liquid mass is made to pass into a cylindrical reservoir or apparatus with a double bottom, called a "heating-reservoir." (See Fig. 5, Sheet 1.) This reservoir is of thin copper tinned inside, and covered all round by an insulating material, by preference with wood. The steam used for heating it enters at the center $o$ into radial pipes $r'$, which are pierced with small holes in such manner as to impart, by the uniform direction of the small jets of steam passing out of the holes, a circulating movement to the steam, which is thus distributed throughout the double bottom, which thus becomes equally heated at every part. Fig. 6, Sheet 1, illustrates the arrangement of the steam-distributer in the double bottom. $t$ is a bent pipe or trap which permits the escape of water arising from the condensation of steam in the double bottom. K is a small condenser in communication with the reservoir by the pipe $i$. The disengagement of the ethers from the liquid mass takes place as follows: The mass is first quickly heated to the boiling-point. As soon as drops of ether issue from the condenser K, the admission of heating steam is reduced to the minimum quantity necessary to keep the liquid mass near the boiling-point. The heat from the steam introduced into the double bottom then rises slowly through the liqbid mass and vaporizes the ethers. The evaporation or the disengagement of the ethers by the slow but sustained heating is thus effected, while at the same time the least possible quantity of alcohol is evaporated. The heating should be moderate and long continued, and the liquid mass kept a little below boiling-point, so that the ethers pass out of the condenser K in drops or in a very thin stream. The operation thus conducted will be economical and advantageous. As the odorous ethers form a very small quantity of the liquid mass, any excessive heat in the double bottom and not expended in vaporizing ether acts injuriously on the alcohol, causing it to vaporize in large quantity at the same time as the ether. When the drops collected in the refrigerator K contain only an infinitesimal quantity of odorous ether, the liquid mass in the heating-reservoir contains really nothing but water and alcohol. To obtain this result is the object of the third operation, which consists in subjecting the liquid mass to a slow and continued heating at a temperature below that at which the alcohol is liberated from the liquid, thus vaporizing the ethers, which are condensed, as described.

When the nature of the last alcoholic product requires that it should preserve a certain proportion either of the essential oils or all or part of the ethers, or both oils and ethers, it is easy to understand that the three operations before described may be regulated accordingly. The object of these three operations is therefore to prepare with the greatest precision any alcoholic liquid to undergo the subsequent operation of being brought to the proof of good-flavored brandy or other portable spirits, or of neutral spirit approaching positive alcohol. These three operations proceed by what I term the "division of labor"—that is to say, there is no attempt to remove all the injurious elements at once or in one vessel, but I endeavor, first, to separate those which are insoluble in a weak alcoholic liquid; secondly, the remaining oils and acids; and, thirdly, the ethers.

Having now explained the object of the first part of this invention, I proceed to describe the second part, which relates to the process for raising to the desired alcoholic degree or proof the phlegm previously rendered neutral or only deprived of its injurious elements.

*Second part*—Description of the sub-process of raising alcoholic liquids of low degree, deprived of their injurious constituents to the degree of strength of brandy, spirit, or alcohol: The liquids to be operated upon are composed, mainly, of alcohol and of water and essences which evaporate at a higher temperature than alcohol. The alcohol in evaporating carries off with it more or less of the vapors of the less volatile constituents, and the object of the process is, first, to distill the alcohol with as little as possible of the less volatile liquids; and, second, to eliminate all the alcohol from the liquid. The process is therefore composed of two continuous and successive but separate distillations; the first effected at the lowest temperature required to expel the alcohol from the liquid, so that the alcohol may pass off contaminated as little as possible with the less volatile constituents, and the second effected at a sufficiently high temperature to expel all the alcohol, so that the least possible loss may accrue. The first distillation is effected by causing the liquid previously heated to pass continuously through an evaporating-pan connected with a concentrating analyzing apparatus and a condenser, so that the alcoholic vapor is concentrated and condensed, while the greater portion of the aqueous vapor that passes off with it from the evaporating-pan is separated from it and returned to the evaporating-pan. The second distillation is effected by causing the liquid which escapes from the first evaporating-pan to pass continuously through a second evaporating-pan (heated to a higher temperature than the first) connected with an independent condenser, so that the alcohol remaining in the liquid is eliminated from it, and is not mixed with the product of the first distillation.

Figure 1, Sheet 1, represents a general plan of the arrangement of a distillery furnished with apparatus for effecting my complete process.

A A are defecating-vats for depriving the phlegms of their injurious constituents, as before described. B is the still or distilling-column for the primary distillation of fermented materials. C is the condenser of the vapors issuing from B. D is a reservoir for the phlegms deprived of their injurious constituents, as before described. The phlegms received in D are heated therein to the boiling-point, but not beyond. E is an evaporating-pan, in which the phlegms coming from D in a regular stream are submitted to evaporation at a low temperature. The alcoholic vapors formed in E are concentrated and rectified in G, and finally cooled in H. F is another evaporating-pan, in which the nearly-spent phlegm which comes from E is submitted to evaporation at a sufficiently high temperature to extract the last particles of alcohol. The alcoholic vapors produced in F are condensed and cooled in I. The reservoir D is provided with a float, $o$, by means of which the quantity of hot phlegms which enters the pan E per minute can be ascertained, so that the flow may be regulated in proportion to the evaporating-power of the pans. The still B, (or the column,) in which the fermented materials are distilled, is heated either by a furnace or by steam from a generator, V. The vapors pass from the still or distilling-column B into C by the pipe $t$. The phlegms condensed in C pass into the defecating-vessels A. They are thence transferred to D, and from D through the pipe $t''$ into E. The phlegms almost deprived of alcohol pass from E into F by the pipe $t'''$, and the residual liquids totally spent are allowed to pass away on their exit from F. T is a pipe which conducts into L the vapors produced in D. T' conducts the alcoholic vapors from E into G. T'' is the return-pipe from G to E. T$^{IV}$ is the pipe which conducts the alcoholic vapors from G to H. T$^V$ is the pipe which conducts them from F to I. U U' U'' are pipes by which steam flows from the generator V to the reservoir D, to the evaporating-pan E, and to the pan F. Z Z' Z'' Z''' are pipes which convey water from the cold-water reservoir K to the apparatuses L, C, G, H, and I.

Fig. 2 is a vertical section through the distillery, following the lines $a\ b\ c\ d$ of Fig. 1, E and F being represented by full instead of by dotted lines, as they should be. The apparatus C should be placed higher than it is represented, in order that liquids passing therefrom should go direct into the vessels A. Z$^{VII}$ is the pipe or trap through which the water arising from the condensation of the steam, which heats the reservoir D, escapes. S S' are the furnaces of the generator V and still B.

Fig. 3 is a vertical section of the distillery, following the lines $g\ h\ i\ j$ of Fig. 1.

Fig. 1, Sheet 2, is a plan of the evaporating-pans E and F. (Shown in Sheet 1.)

Fig. 2 is a longitudinal elevation of the same. $s\ s$ are pressure-screws or joint-fasteners to secure tightly the covers which close the chambers in which the alcoholic liquid and the heating-steam circulate.

Fig. 3 is a horizontal section at the line $a\ b$ of Fig. 2. The phlegm or alcoholic liquid to be evaporated enters the pan E by the pipe $t''$, coming from the heating-reservoir D, where it has been previously heated to the boiling-point. The phlegm traverses successively the contiguous shallow channels $i$ of the pan E, and during its passage it is heated from below by steam from the generator V. The steam from V being at a higher temperature than the boiling-point of the alcoholic liquid, alcoholic vapor is constantly given off by this liquid from the time of its entrance into the pan E by the pipe $t''$ until the time of its exit by the pipe $t'''$, but the formation of vapor being more and more difficult in proportion as the liquid becomes deprived of alcohol—that is to say, in proportion as it advances in the evaporating-pan—the pan is a little more inclined at the entrance than at the exit, in order that the current of liquid may leave it as much spent as possible before passing by the pipe $t'''$ into the pan F. The pan F is divided like E, so as to form a continuous channel, through which the liquid traverses from one end to the other; but the pan F is heated below by steam at a sufficiently high temperature to evaporate the last particles of alcohol from the liquid, so that it may pass out of the pan containing only water and other foreign matters separated from the alcohol. In the pan F, as in the pan E, the current of liquid becomes shallower as it reaches the discharging end of the pan.

Fig. 4 is a vertical section through the line $c\,d$ of Fig. 1. $i\,i$ represent the partitions which form the channel by which the liquid traverses the pan E from end to end. The pan F has similar partitions, but arranged as shown in Fig. 3. $e\,e'$ are the two chambers of the evaporating apparatus. The heating-steam comes from the generator V by the pipe U', and enters by the distributer $d'$ into the chamber $e$. The distributer $d'$ is in the form of a flattened pipe pierced with holes its whole length in such manner as to regularly introduce the steam in the form of a sheet as broad as the chamber $e$. The water arising from the condensation of steam in the chamber $e$ issues therefrom by a pipe, $Z^{IV}$. The alcoholic vapors formed in the chamber $e'$ is carried off by the pipe $T'$ into an analyzing-concentrator. The alcoholic vapor is carried off in a similar manner from the pan F by a pipe, $T^V$. A steam-distributer, $d''$, similar to $d'$, introduces steam in the form of a continuous sheet into the chamber $e$ of the pan F. Water arising from the condensation of steam in this chamber $e$ passes off by the pipe $Z^V$. To the chamber $e$ of each of the pans E F an escape-valve, $o$, is fitted, which serves to maintain a uniform pressure therein or to insure that the heat of the steam shall not be too great. The constant degree of heat is respectively determined by the weight $p$ on each escape-valve. The surface of the pans E F, as well as the breadth of the channels, depends upon the quantity of work which it is desired to perform, and the apparatus is constructed accordingly. The same may be said of the inclination given to the pans. The top and bottom of these pans can be immediately removed for cleaning by hand. The inner surface of the pans is tinned all over.

Fig. 1, Sheet 3, is a vertical section of the concentrating analyzing apparatus marked G in Fig. 1, Sheet 1. It is composed of two concentric cylinders, $n\,n'$, between which water is made to circulate, entering at top in the distributer $c$, which is constructed in the form of a gutter, and the water circulates therein rapidly all round. The gutter $c$ is pierced all round with small holes $o$, through which the water passes into a jacket, $b$. The water descends from the jacket $b$ into the narrow space $l$, and passes out by the pipe $j$. The interior of the cylinder $n'$ is fitted with cylindrical vessels $m$, superposed and separated by circular plates or annular pans $p$ with apertures in the center. The vessels $m$ form between themselves chambers $e\,e'\,e''\,e'''\,e^{IV}\,e^V$. The alcoholic or other vapor the temperature of which is to be lowered enters the chamber $e$ by a pipe, T, terminating in a Rose spreader. To pass from the chamber $e$ to the chamber $e'$ the vapor has no other passage than the narrow space $g$ between the side of the vessel $m$ and the cylinder $n'$. The water between the two cylinders being of a lower temperature than the vapor which has entered the chamber $e$, it follows that during the passage of the vapor through the space $g$ part of the aqueous vapor becomes condensed, and the remainder which reaches the chamber is vapor of a more concentrated degree, or contains a larger proportion of alcohol. The same operation takes place from the chamber $e'$ to the chamber $e''$, and so on for all the chambers until the vapor passes off by the pipe $T^{IV}$. The number of vessels and the height and breadth of the spaces $g$ will vary according to the work to be performed. The cylindrical body $f$ of each vessel is fitted with projecting helical partitions, as indicated in Fig. 4, which form a helical channel around the vessel and compel the vapor coming from the chamber $e$ to pass around the vessel in the helical channel, and to remain in contact more or less long with the side of the cylinder $n'$ before passing into the chamber $e'$. The same helical channel for the vapor is adapted to all the vessels. The portions of the vapor condensed in the spaces $g$ fall on the annular pans $p$ and vessel $m$, when they are partly revaporized. The remainder descend from stage to stage by the overflow-pipes $q$, and finally issue from the apparatus by the return-pipe $T''$, to again enter the evaporating apparatus. The lower end of each pipe $q$ dips into a small cup, $u$, of sufficient depth, and which is filled by the first liquid which falls on the bottom of the vessel or pan which is on the same level as the upper edge of the cup. In order to regulate the circulation of the liquid on the bottoms of the vessels and pans, the bottoms are fitted with spirals $s$, Figs. 3 and 5, which form a continuous spiral channel.

Fig. 3 refers to the vessels $m$, and Fig. 5 to the annular pans $p$.

The whole apparatus, consisting of the cylinders $n\,n'$, vessels $m$, and annular pans $p$, admits of being separated piece by piece to be cleaned by hand.

Figure 7:
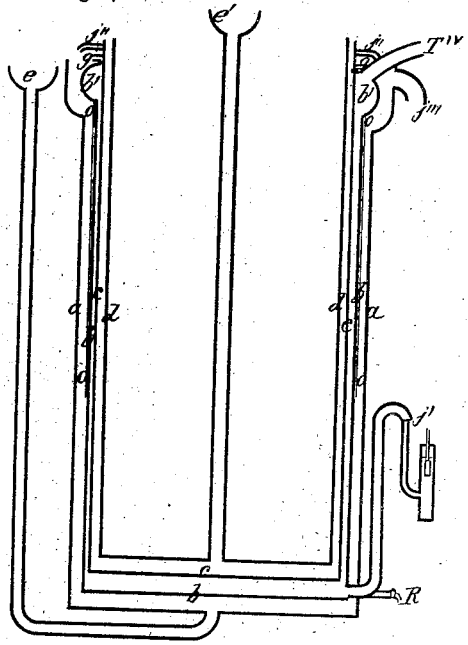

Fig. 7 is a vertical section of the refrigerating-condenser H. (Shown in Fig. 1, Sheet 1.) It is composed of four vessels, $a\,b\,c\,d$, fitted to each other at a very slight distance apart. Between the sides of the vessels $a\,b$ and those of the vessels $c\,d$ refrigerating water circulates. It enters continuously through the funnels $e\,e'$, and issues continuously by pipes $j''\,j'''$. The vapor to be condensed enters by a pipe, $T^{IV}$, into a large jacket, $b'$, from which it spreads into the thin space contained between the sides of the vessels $b$ $c$, which give it the form of an extremely thin cylindrical film, in contact on both sides with refrigerating water, which is incessantly renewed, all in thin films. The liquid arising from the condensation of the vapor falls into the space contained between the bottoms of $b$ and $c$, and rises therein up to the height of the exit-pipe $j'$, in such manner that the liquid remains in the bottom of the apparatus sufficiently long to be reduced to the temperature of the adjoining water, the stream of which surrounds it on both sides. In order to allow the air which the vapor may carry with it to escape from the space in which the condensation of the vapor takes place, there is immediately above the level of the condensed liquid a number of pipes, $o$, which terminate at top in a horizontal circular pipe ending in a vertical pipe of sufficient size, communicating at the top of the level of the water with the external air. By this method the air which the vapor carries with it passes off regularly from the space $b$ $c$ of the apparatus without carrying off with it either vapor or alcoholic liquid. The two vessels $b$ $c$ are joined at top by flanges $g$, which are fitted one on the other, and which are made to adhere hermetically by means of pressure-screws. By loosening these screws the vessels $b$ $c$ become independent, and the four vessels may be entirely separated, in order that the sides thereof may be cleansed by hand. The interior surfaces of the two vessels $b$ $c$, which are in contact with the alcohol, are tinned. The breadth of the narrow spaces for the water and the vapor is variable, according to the work to be performed, and the apparatus is constructed accordingly, retaining, however, the capability of unfastening the vessels $b$ $c$ for cleansing. The alcoholic liquid may also be allowed to flow out directly and immediately, without remaining in the reservoir, by the exit-pipe $j'$. In such case the air-pipes $o$ are unnecessary, as the air escapes by the same pipe through which the alcoholic liquid arising from condensation flows.

The apparatus may be constructed of any dimensions as regards breadth and height, according to the amount of work to be performed.

R is a cock for drawing off the liquid from $b$ $c$ at the end of the operation.

Figure 8:
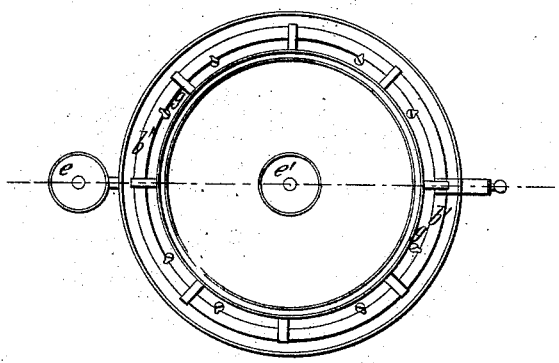

Fig. 8 is a plan of the apparatus.

Figure 1:
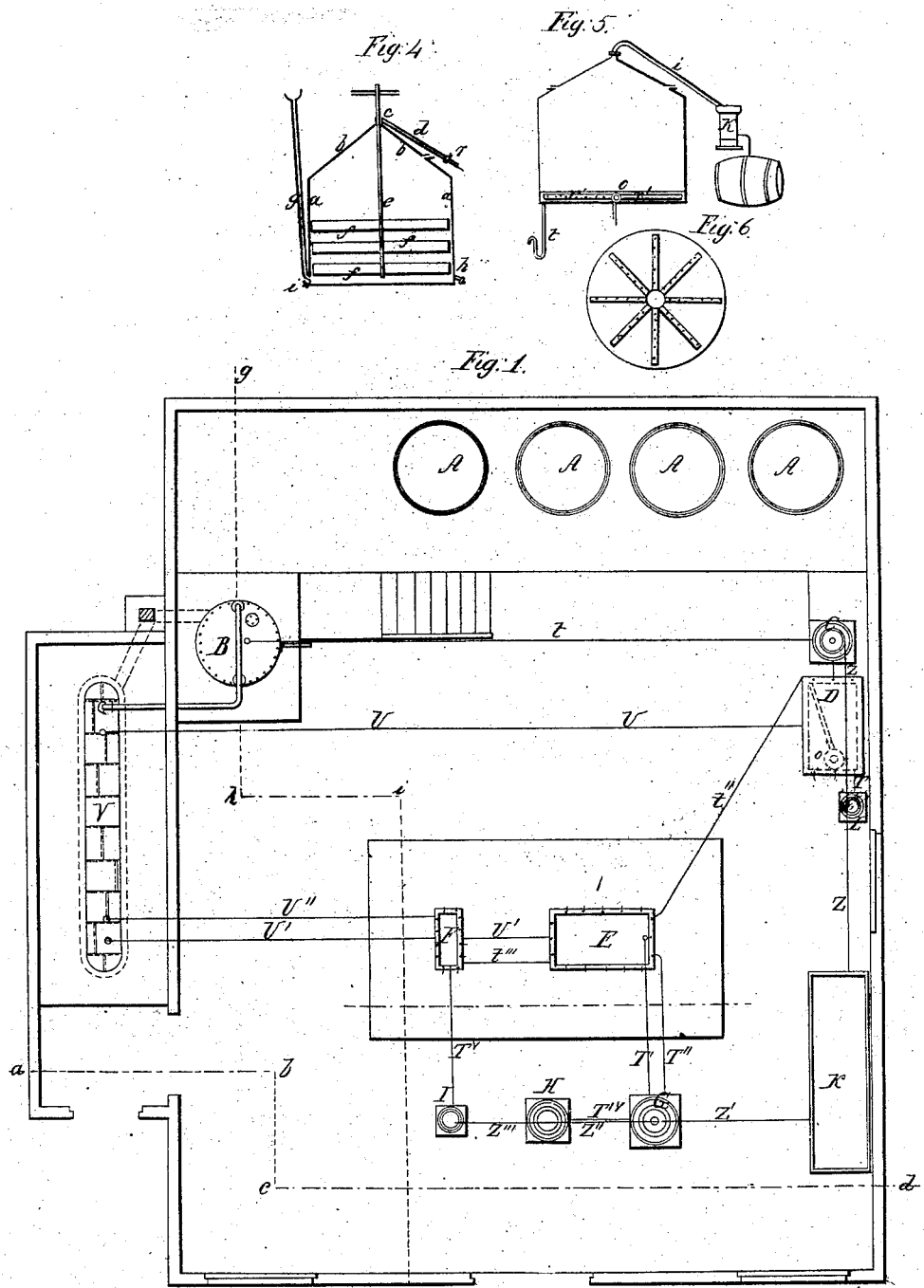
Figure 2:
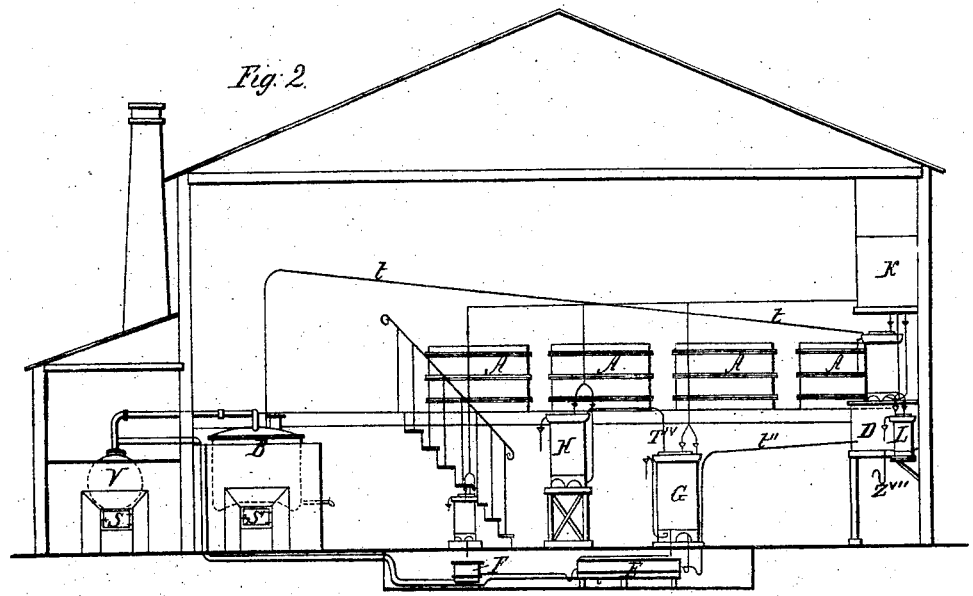
Fig. 2 is a plan of the cover of the cylinder $n'$. This movable cover is fastened upon the cylinder $n'$ by pressure-screws.
Figure 3:
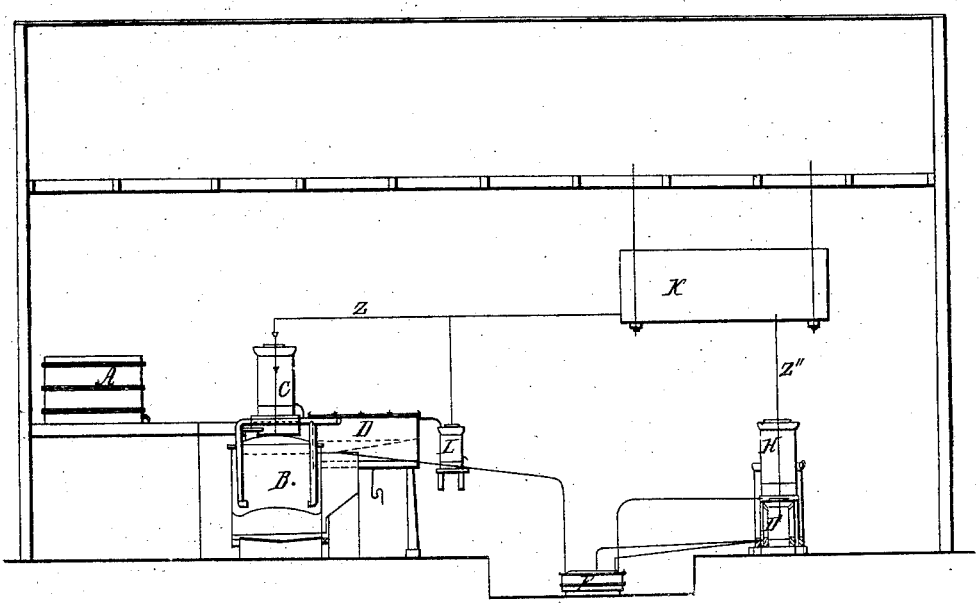
Figure 4:
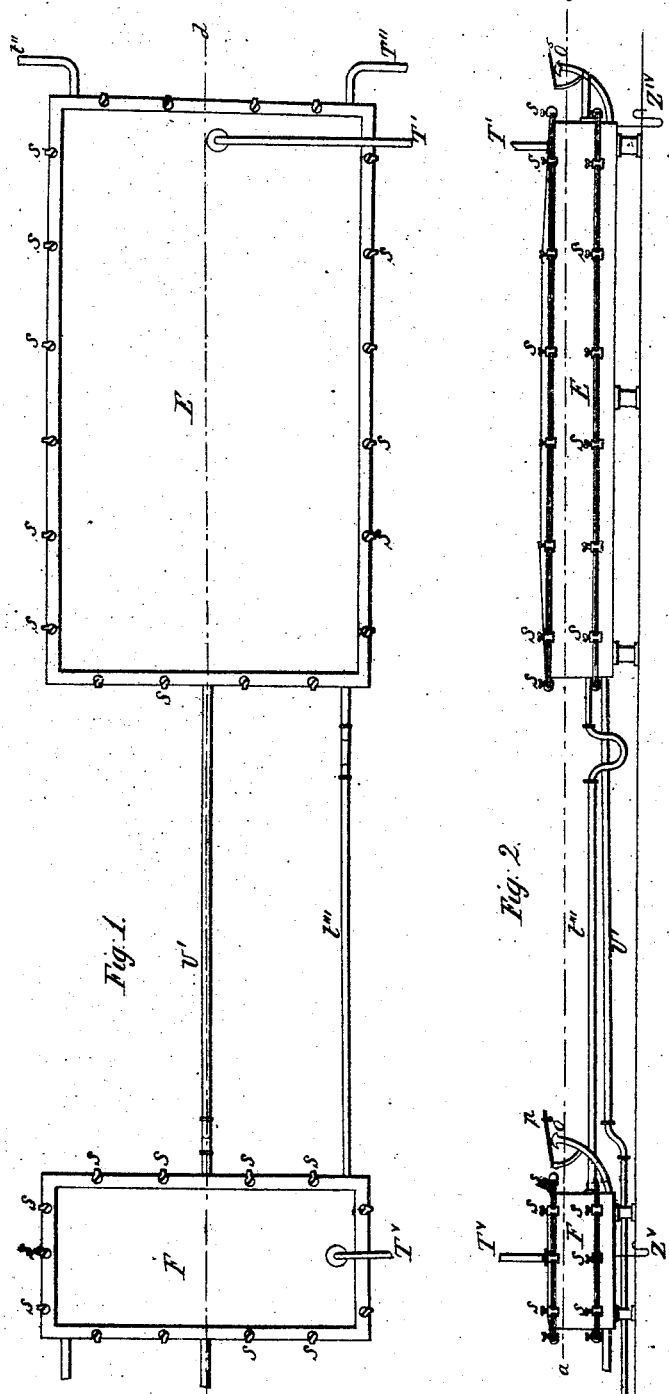
Figure 5:
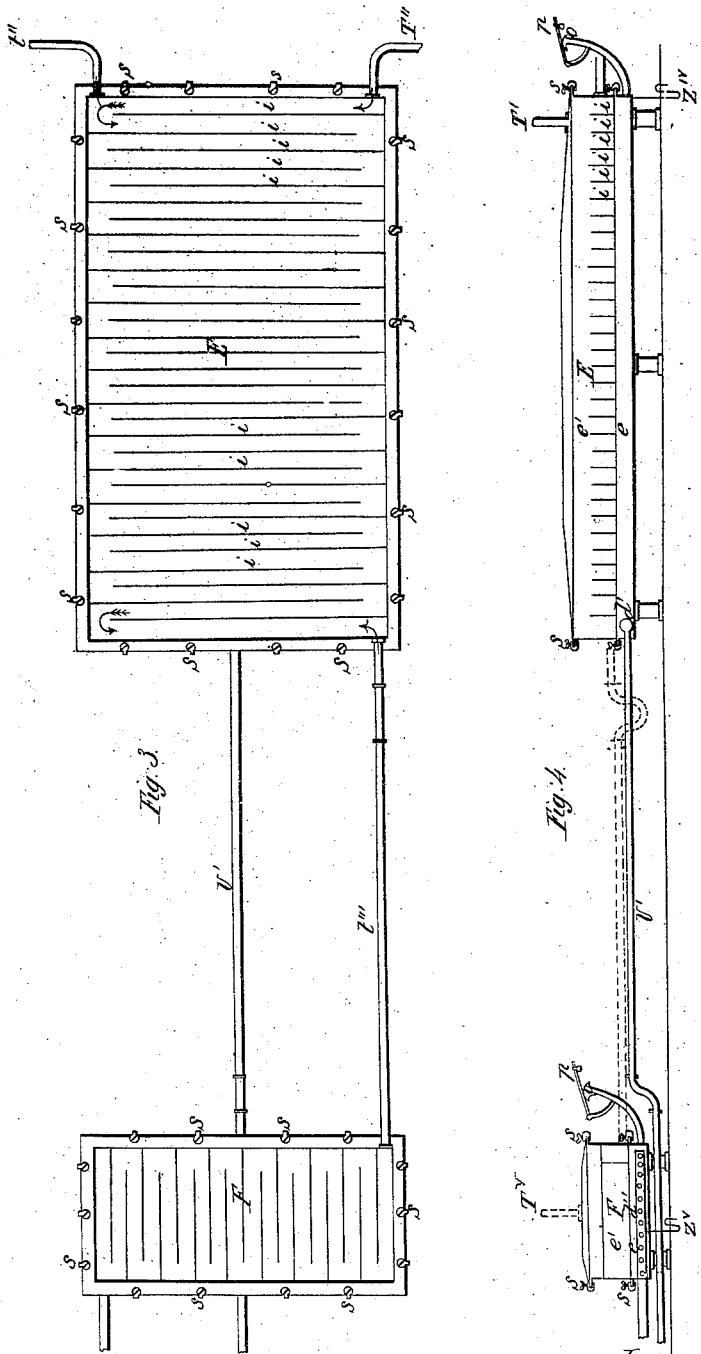
Figure 6:
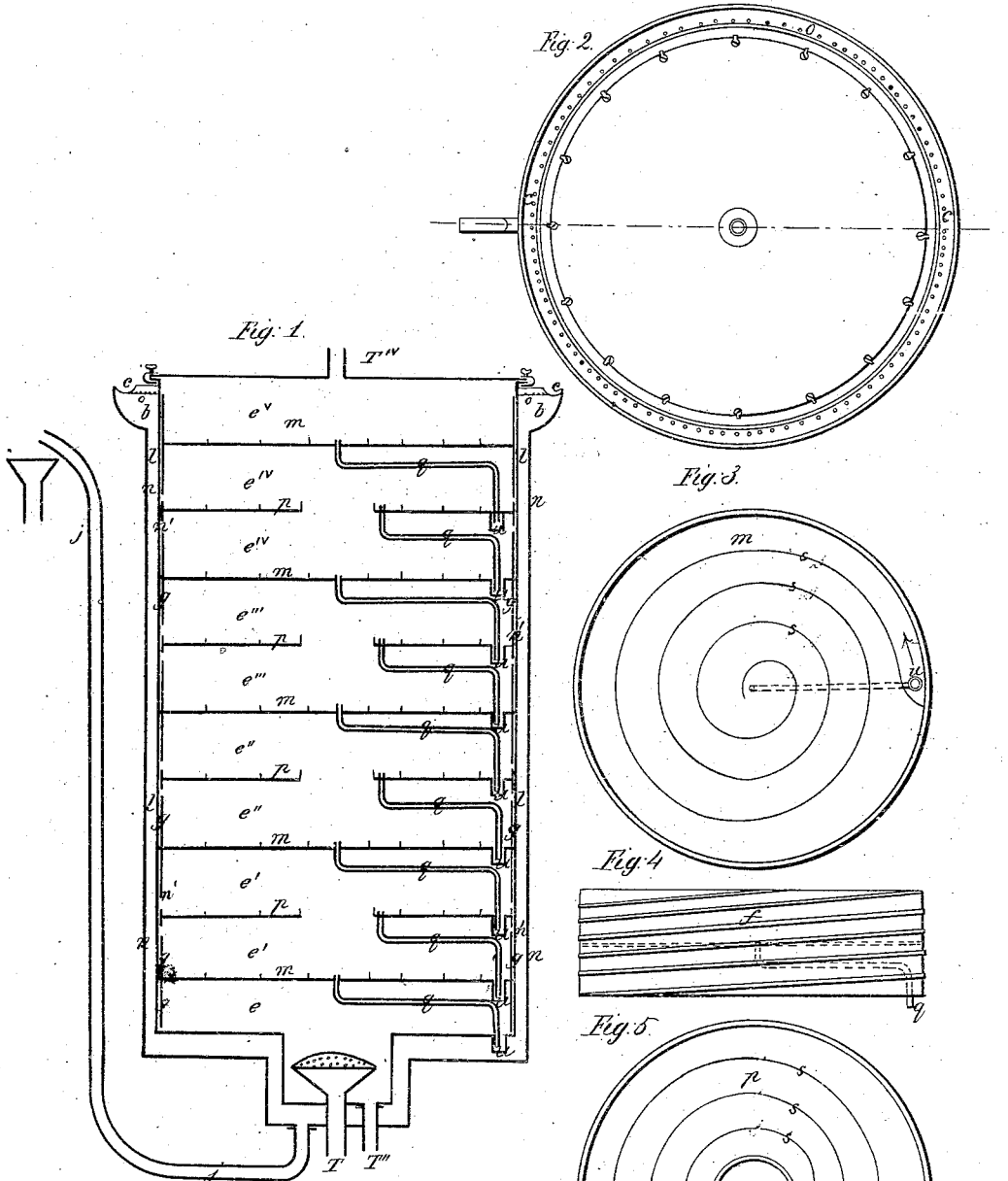
Fig. 6 is a side elevation of one of the annular pans $p$.

The above description applies to the refrigerating-condensers marked C, L, and I in Fig. 1, Sheet 1, as well as to the refrigerating-condenser marked H.

The following are the advantages resulting from the previous deprivation of the phlegms of their injurious constituents before raising them to the degree of alcoholic strength required for good-flavored spirits and neutral alcohol. Not only are the injurious constituents which the phlegm or wine contains separated with certainty by the above-described processes, but the separation is performed in the most economical and easy manner, since each of the injurious constituents is removed from the phlegm by a special process particularly adapted to that constituent. By this previous deprivation the product obtained by the rectifying apparatus from the beginning of the operation to the end is good-flavored spirits of the first quality, or absolutely neutral alcohol.

The spirits obtained by the systems of rectification hitherto employed have generally had a flavor of copper and a bitter flavor, due to the presence of oils, ethers, and other injurious substances, which have necessitated the allowing of these spirits "to age," as it is termed, in casks, in which they gradually and slowly lose their injurious properties. A great loss results from this practice, arising, first, from the inevitable evaporation of the alcohol, then the interest on the capital represented by the casks and the buildings or cellars in which they are stored. The combination of these losses is suppressed by the employment of the before-described processes of purification and rectification, since the processes have precisely for their object to completely and immediately deprive the phlegm or wines of the same injurious properties which in the old systems were only imperfectly removed after a prolonged lapse of time. By this invention the phlegms or wines, being previously deprived by sure processes of all injurious properties, may be immediately sold and consumed as spirits of the first quality.

From the foregoing description it will be seen that the entire process is composed of two primary sub-processes, and that the first of these is composed of secondary sub-processes. It is be believed that the best results will be obtained by the use of the entire process; but the distiller who does not deem it expedient to use the entire process may employ one or more of the sub-processes with advantage.

The object of the second primary sub-process, which consists of a continuous simultaneous double distillation (primary and secondary) of the phlegm at different temperatures, with a separate condensation of the products of each distillation, is first to eliminate the alcohol with as little as possible of the constituents which are less volatile than alcohol; secondly, to eliminate the residue of the alcohol which passes off with the essences which are less volatile than alcohol, but more volatile than water, and thus save the alcohol without permitting the mixture of this alcohol with essences to contaminate the product of the primary distillation at the lower temperature; and, thirdly, to do the work continuously, so that time, fuel, and labor are saved.

What is claimed in this patent as the invention is—

1. The process of separating injurious constituents from phlegms or other alcoholic liquid prior to distillation by diluting it, permitting it to rest, and decantation, substantially as set forth.

2. The process of separating injurious constituents from phlegms or other alcoholic liquid prior to distillation by treating it with gypsum or its equivalent, substantially as set forth.

3. The process of separating from phlegm or other alcoholic liquid injurious constituents which volatilize at a lower heat than alcohol by subjecting the phlegm to continued heating at a lower temperature than is required for the distillation of alcohol prior to the distillation, substantially as set forth.

4. The process of separating the injurious constituents from phlegm or other alcoholic liquid prior to distillation by the combination of the three secondary sub-processes—of dilution and decantation, treatment with gypsum or its equivalent, and heating at a temperature lower than is required for the distillation of alcohol—substantially as set forth.

5. The process of distilling phlegm or other alcoholic liquid by two consecutive simultaneous and continuous distillations, (the first at the lowest practicable temperature required to disengage the alcohol in vapor and the second at a temperature sufficient to expel the remaining alcohol,) and of condensing the products of each distillation in a separate vessel, so that they do not mingle, substantially as set forth.

6. The process of distilling phlegm or other alcoholic liquid, substantially as specified in the last preceding claim, in combination with the process of separating the injurious constituents prior to distillation, substantially as specified in the fourth claim.

7. The process of distilling phlegm or other alcoholic liquid, substantially as specified in the fifth claim, in combination with each of the preliminary separating processes specified in the first, second, and third claims.

In witness whereof I have hereunto set my hand.

FRANCOIS HAECK.

Witnesses:
T. VIRNEBURG,
G. DAWES.